United States Patent [19]
Hancock

[11] Patent Number: 5,848,816
[45] Date of Patent: Dec. 15, 1998

[54] FLEXIBLE ANIMAL PULL APPARATUS

[75] Inventor: Jerry Hancock, Greer, S.C.

[73] Assignee: J. Michael Kay, Taylors, S.C.; a part interest

[21] Appl. No.: 906,373

[22] Filed: Aug. 5, 1997

[51] Int. Cl.$^6$ .............................. A01M 31/00; B65G 7/12
[52] U.S. Cl. ................. 294/15; 294/26; 294/169
[58] Field of Search .................................. 294/2, 15, 16, 294/26, 74, 81.56, 82.1, 82.11, 82.13, 153, 156, 167, 169; 224/921; 452/185, 187, 189–192, 197

[56] References Cited

U.S. PATENT DOCUMENTS

| | | |
|---|---|---|
| D. 312,164 | 11/1990 | Pierotti . |
| 1,887,358 | 11/1932 | Lucks-Osten ........................... 294/169 |
| 2,592,059 | 4/1952 | Nederostek .............................. 294/2 X |
| 3,686,710 | 8/1972 | Shankland . |
| 3,752,525 | 8/1973 | Hanna et al. . |
| 4,023,844 | 5/1977 | Roberts ..................................... 294/26 |
| 4,243,164 | 1/1981 | Burlison et al. . |
| 4,444,375 | 4/1984 | Horn . |
| 4,529,240 | 7/1985 | Engel . |
| 4,605,094 | 8/1986 | Minerd . |
| 4,828,307 | 5/1989 | Sokol et al. . |
| 4,887,823 | 12/1989 | Hallett et al. . |
| 5,145,224 | 9/1992 | Welk ................................... 294/153 X |
| 5,316,356 | 5/1994 | Nutting . |
| 5,382,064 | 1/1995 | Blais .......................................... 294/26 |

Primary Examiner—Johnny D. Cherry
Attorney, Agent, or Firm—Hardaway Law Firm, P.A.

[57] ABSTRACT

A foldable animal pull apparatus which forms a rigid bar when two rigid bars of equal-length are extended. Attached at a center position of the two attached bars is a flexible connector and hook clasp attachment which serves as an animal pull for the removal of fallen animals from the woods. The animal pull apparatus forms a rigid two-piece bar when extended, with two handles and a cable and hook hanging from the center of the bar. When folded, the animal pull folds into compact shape which can be carried in the pocket or in a vest of a hunter. The benefit of the foldable animal pull is that the structural integrity of the extended two handled bar is improved by a support block and pivoting mechanism which provides a two-handled bar that is strong and durable. The mechanism of the flexible connector and spring-loaded hook and clasp closure includes a swivel to allow attachment of the piercing end of the hook to the fallen animal which provides a hunter with a two-handled apparatus which attaches firmly to the fallen animal for movement and dragging of the fallen animal from the woods. When the animal pull apparatus is folded, the two handles collapse toward themselves with a flexible connector and spring-loaded hook and clasp closure situated between the two handles, forming a compact apparatus for easy storage for a hunter when hiking through the woods.

13 Claims, 5 Drawing Sheets

FLEXIBLE ANIMAL PULL APPARATUS

BACKGROUND OF THE INVENTION

1. Field of the Invention

This invention relates generally to the art of hunting and more particularly to an apparatus for removing a fallen animal from the field.

2. Description of the Prior Art

Many prior art devices exist for the removal of fallen animals from the field. Some prior configurations of animal dragging and pulling apparatus have consisted of one piece bars attached to ropes which attach by different methods to the fallen animal. The prior devices may or may not have been collapsible for ease of carrying by the hunter. In Shankland, U.S. Pat. No. 3,686,710, a collapsible deer drag is described which utilizes three pieces for folding into a configuration that does not include the length of rope required for attaching to a deer. In Nutting, U.S. Pat. No. 5,316,356, a game dragging device is described that utilizes ropes and a pair of tongs to attach to a fallen deer. Thus these and other prior configurations have shortcomings based on size, strength, or limitations imposed by the attachment devices. Thus, there exists room for improvement within the art.

SUMMARY OF THE INVENTION

It is an object of this invention to provide an apparatus for removing a fallen animal from the field.

It is a further object of this invention to provide such an apparatus which also permits lifting of the animal into a vehicle for removal from the field.

It is an additional object of this invention to provide an apparatus which folds into a small package to allow for ease of carrying in the field.

These and other objects of the invention are accomplished by a method and apparatus for pulling a fallen animal from the woods by attaching a hook to one part of the animal, while the user pulls on a two-handled bar connected to the hook by a cable. The apparatus has two generally rigid bars pivotally connected to one another by a center block attached to the pivot at one end, and at the other end of the center block, a flexible connector which in turn is connected to a flesh piercing hook capable of interconnecting with the nasal septum of a fallen animal.

DETAILED DESCRIPTION

In accordance with this invention, it has been found that fallen animals from a hunt may be quickly and easily removed from the field environment by an apparatus which is easily transported by the hunter, and easily removed for use. Various other features and advantages will become apparent from a reading of the followed detailed description, given with reference to the various figures of drawing.

Figure 1:
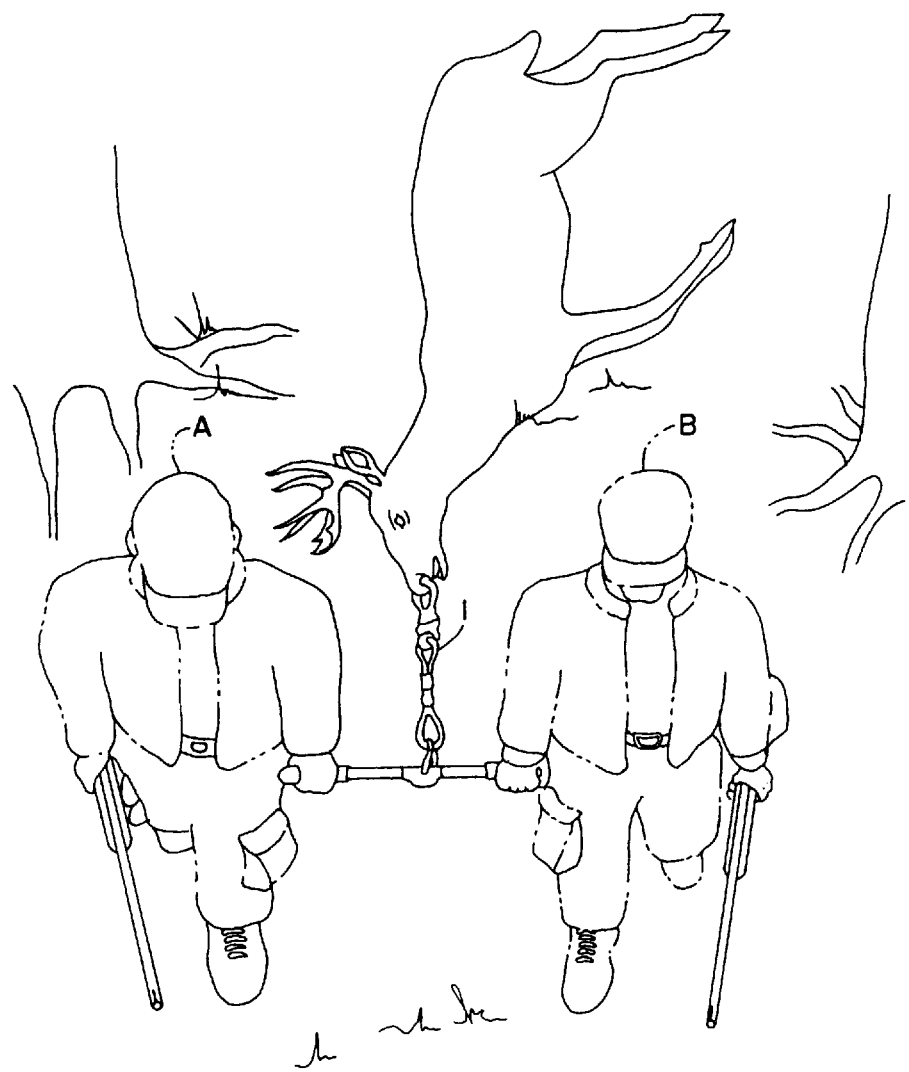
FIG. 1 is a view of the foldable animal pull apparatus extended and in use for removal of a fallen animal.
Figure 2:
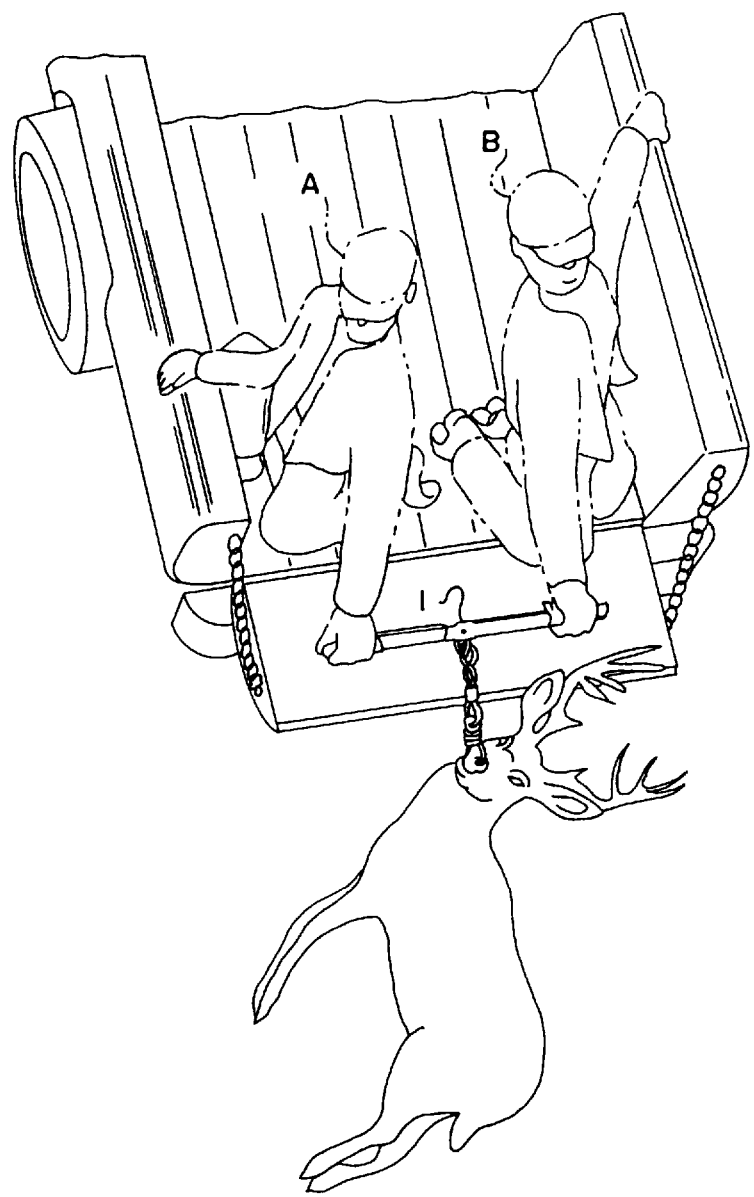
FIG. 2 is a view of the foldable animal pull apparatus in use in accordance with this invention.
Figure 3:
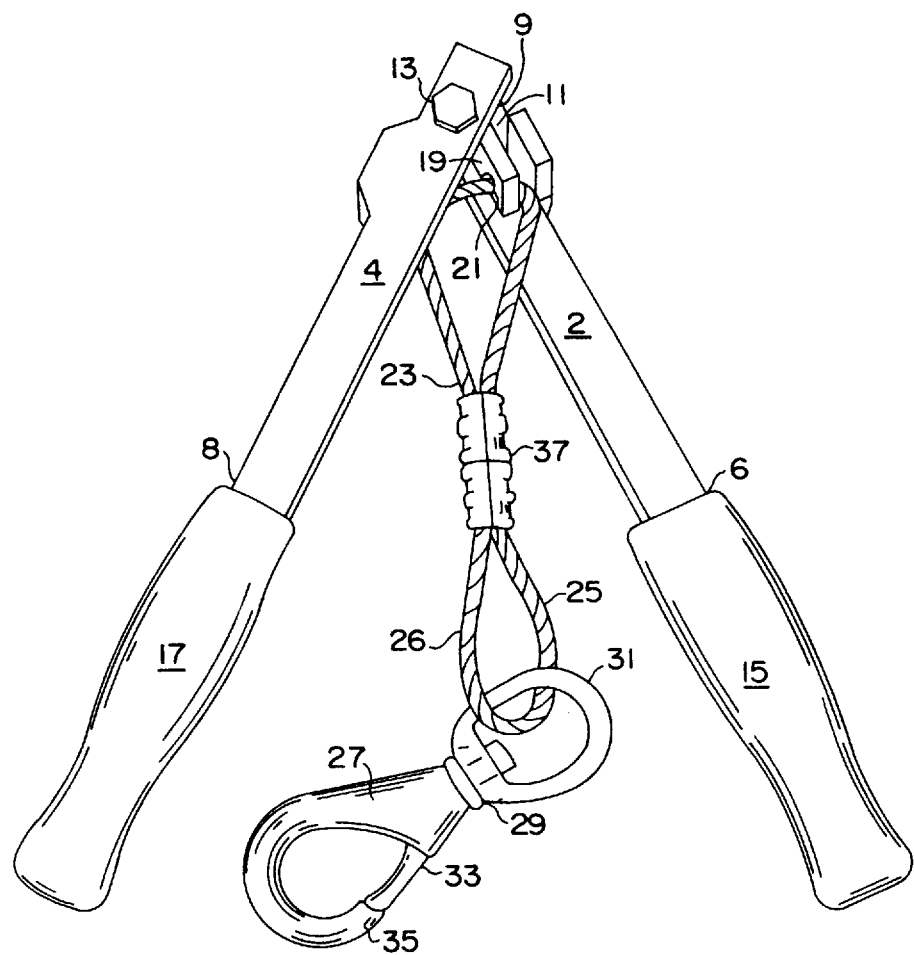
FIG. 3 is a side view of the foldable animal pull apparatus.

FIGS. 1 and 2 of the drawings depict the apparatus 1 in accordance with this invention as it is used for removal of a fallen animal from the field environment by hunters A, B. After attaching the apparatus 1 through the nasal septum of the fallen animal, the animal can be dragged from the woods, and lifted and loaded into a vehicle by the user. As seen in FIG. 3, the apparatus 1 has a pair of generally rigid bars or arms of equal length 2 and 4. The foldable bars or arms 2 and 4 are connected at ends 3 and 5 at a pivotal connection 7 to allow pivoting at a center joint 9. The exemplary dimensions of each bar, 2 and 4, are 9 inches by 0.5 inch by 0.25 inch. The two bars, 2 and 4, are connected at a center block 11, which is located between a first end 3 of the right bar 2, and the first end 5 of the left bar 4. Ends 3, 5, and block 11 are held together by a bolt 13, which allows pivoting of the two bars 2, 3 and 4, 5 around the bolt 13 and the center block 11.

The second end 6 of the right arm 2 is encased in a rubberized handle 15 as is the second end 8 of the left arm 4 of the bar. Left arm 4 has the same dimensions as the right arm, with a rubberized covering on the distal end forming a handle 17.

Figure 4:
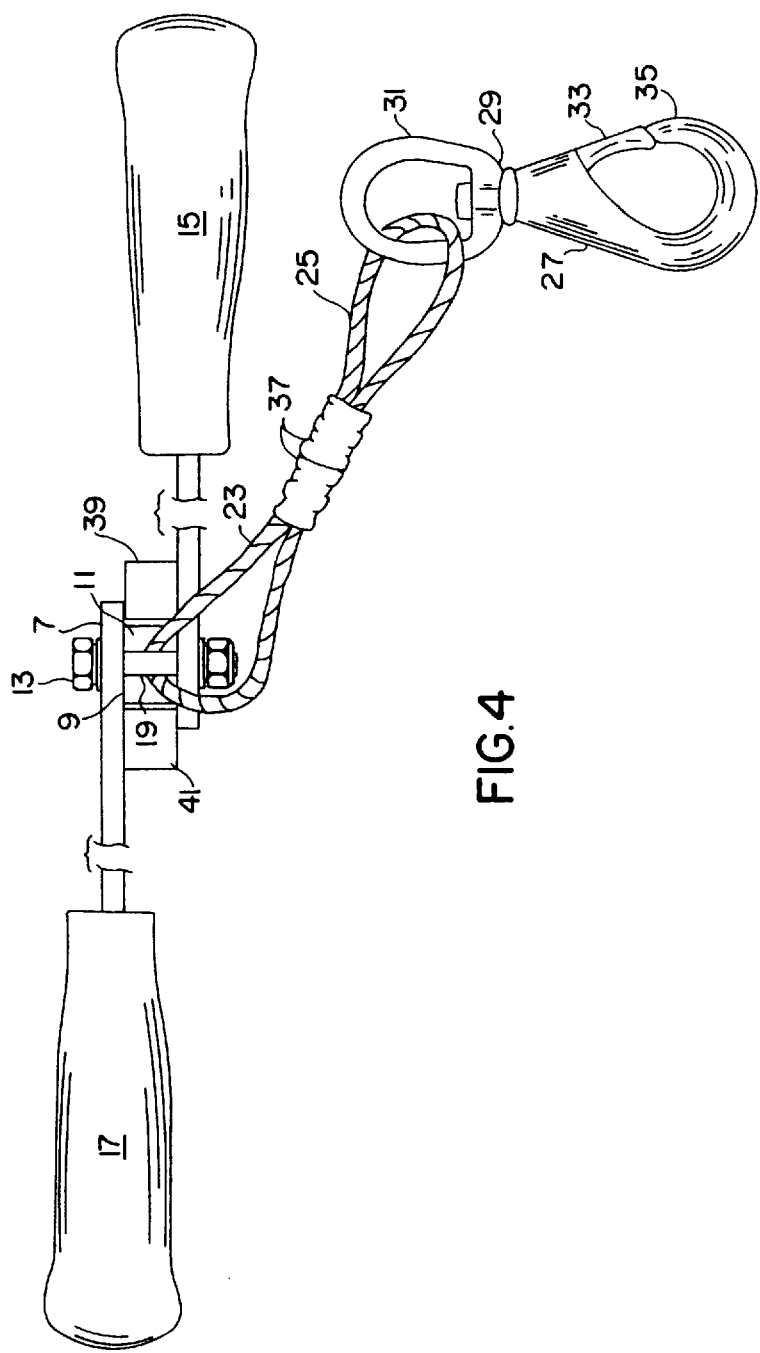
FIG. 4 is a bottom view of the foldable animal pull apparatus.
Figure 4A:
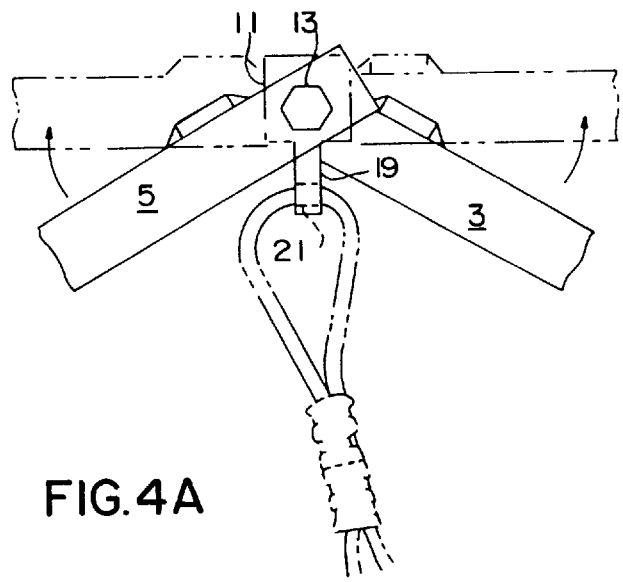
FIG. 4A is an elevational view of a portion of the present invention displaying the arms in a partially deployed position and, in phantom, the arms in a fully extended position.

In FIG. 4, the bottom view of the apparatus 1 is depicted to illustrate how arms 2, 4 are attached at the center joint 9, which is formed by the proximal end 3 of the right arm 2, and the proximal end 5 of the left arm 4, connected by bolt 13 mechanism at the center block 11. The center block 11 has the approximate dimensions of 0.75 inch width, 0.5 inch thick, and 1.5 inches long, and as shown in FIG. 4A, the length of the center block ends in an extension 19 of the center block of metal of the dimensions of 0.25 inch in width, 0.5 inch in thickness. The center block extension 19 has a hole 21 near the end of the center block 19 extension located inside and pointing down between the right arm 2 and left arm 4 of the apparatus.

A flexible connector 23 is connected near the first ends 3, 5, of the two bars 2, 4, to the center block 11, by passing through the hole 21 in the center block extension 19. The flexible connector may be formed of steel cable or other metal cord. The flexible connector 23 has a loop 25 at the second end 26, distal from the center block 11, to a hook 27 that has a swivel 29 and a metal loop 31 which passes through the other end 25 of the flexible connector 23. Hook 27 has a spring loaded clasp closure 33 which remains in contact with the piercing end 35 when no tension is placed on the clasp closure 33. Clasp closure 33 is displaced into the inside curvature of the hook 27 when the piercing end 35 of the hook 27 is placed in the nasal septum of the fallen animal, or into another part of the fallen animal. Flexible connector 23 is formed into a loop at both ends of the flexible connector 23 by means of metal connection pieces 37 which are located approximately mid-length of the distance of flexible connector 23 between the center block extension 19 connection and the connection of the metal cable loop with the metal loop 31 of the hook 27.

Figure 5:
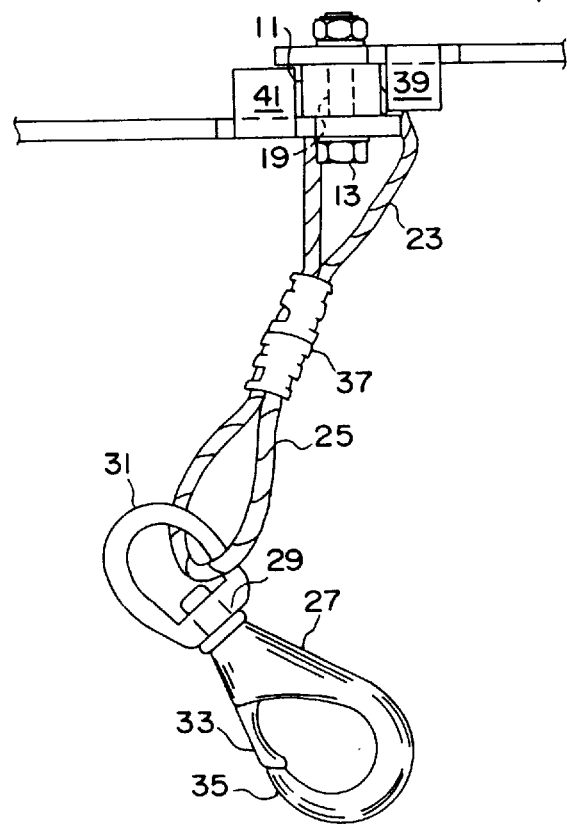
FIG. 5 is a top view of the foldable animal pull apparatus.

As seen in FIG. 5, top view, the right arm 2, and the left arm 4, are connected at the center joint 9 by a single bolt 13 which allows the two metal arms to be extended to form a generally rigid bar. The single connecting bolt 13 allows rotation of the right arm 2 and left arm 4 from a folding position where the right handle 15, and left handle 17 are side-by-side and nearly touching, to an extended position where the right 15 and left 17 handles and arms form a generally rigid, straight rod, with the center block extension 19 protruding downward to form a "T" configuration, as seen in FIG. 3, 4, and 4A.

The flexible connector 23, metal loop cable 25, connection pieces 37, and hook 27 extend downward from the center block extension 19, when the two handles are in a straight rod configuration. The flexible connector 23, metal loop cable 25, connection pieces 37, and hook 27 are situated between the arms 2 and 4, and handles 15 and 17 when the arms 2 and 4 are folded. This folded position allows the animal pull apparatus 1 to be carried in a compact shape of exemplary dimensions of: 9.0–9.5 inches long, 1.5 to 2.0 inches wide, and 1.5 to 2.0 inches thick, which allows the foldable animal pull apparatus 1 to fit when folded into a pocket of a hunting vest, a coat, or the pant pockets of a hunter.

The two handles form a generally rigid bar when extended as shown in FIG. 5 due to a reinforcing, right square stop block 39, and a left square stop block 41 that abut against the center block 11, at the center of the center joint 9 when the apparatus is in an extended, straight bar configuration. The straight bar configuration, with the two handle ends 15, 17 approximately 17.0 inches apart (when extended fully), allows for one hunter or two hunters to pull on the straight bar when the piercing end 35 of the hook 27 is fly lodged in the fallen animal's nose, mouth, jaw, or leg, as shown in FIG. 1 and 2.

Although the present invention has been described in considerable detail with the reference to a preferred version thereof, other versions are possible. For example, the arms of the generally rigid bars 2 and 4 may be different dimensions or the metal material may be replaced with high density graphite composite materials. The central connecting bolt 13 for the central joint 9 may have a comparable pivot pin to allow for opening and closing of the two arms of the foldable animal pull. The flexible cable 23 may be composed of steel wire or a high-strength polypropylene or polymer cord, and the metal clasp closure 33 may be constructed of the other high-strength materials. More than one similar connecting cables 23 and 25, and hooks 27, and spring-loaded clasp closures 33 may be attached to the center joint 9 by the center block 11 and center block extension 19 as a comparable version of the foldable animal pull 1.

It is thus seen that the apparatus of this invention provides for easy removal of a fallen animal from the field environment, and provides for the lifting of that fallen animal into a vehicle for such removal. The apparatus provides a compact and easily-carried folded apparatus which can be quickly unfolded for use by a hunter. Many variations will undoubtedly become apparent to one skilled in the art upon a reading of the above specification with reference to the drawings. As the foregoing description is exemplary in nature, the spirit and scope of this invention should be measured only by the following appended claims.

What is claimed is:

1. An apparatus for moving an object, comprising:
   a block having a front surface, a rear surface and opposite side surfaces;
   a pair of handles pivotally connected to said block, each handle having:
      a proximal end positioned adjacent a respective one of said front surface and said rear surface of said block; and
      a tab extending from said proximal end; and
   a fastener connected to said block for securing the apparatus to the object;
   wherein said pair of handles are pivotable between a closed position, in which said pair of handles substantially overlap each other, and a deployed position, in which said tabs on said pair of handles engage a respective one of said side surfaces of said block.

2. The apparatus for moving an object as recited in claim 1, wherein said fastener comprises a cord.

3. The apparatus for moving an object as recited in claim 2, wherein said fastener further comprises a hook attached to said cord.

4. The apparatus for moving an object as recited in claim 3, wherein said hook comprises a spring loaded hook at a first end and a swivel at a second end, wherein said cord attaches to said swivel.

5. The apparatus for moving an object as recited in claim 1, wherein said block further comprises a top surface; and
   wherein said tabs on said pair of handles are substantially flush with said top surface of said block when the apparatus is in said deployed position.

6. The apparatus for moving an object as recited in claim 1, wherein each of said pair of handles further comprises a cushion surrounding a distal end to provide comfort to a user of the apparatus.

7. An apparatus for moving an object, comprising:
   a block;
   a pair of handles pivotally connected to said block;
   fastener connected to said block for securing the apparatus to the object; and
   a means for limiting pivotal movement of said pair of handles.

8. The apparatus for moving an object as recited in claim 7, wherein said fastener comprises:
   a cord secured to said block; and
   a hook attached to said cord.

9. The apparatus for moving an object as recited in claim 8, wherein said hook comprises a spring loaded hook at a first end and a swivel at a second end, wherein said cord attaches to said swivel.

10. The apparatus for moving an object as recited in claim 7, wherein each of said pair of handles further comprises a cushion surrounding a distal end to provide comfort to a user of the apparatus.

11. An apparatus for dragging game, comprising:
   a pair of elongated, rigid handles, each handle having a longitudinal axis and comprising:
      a distal end;
      a proximal end having an aperture therein; and
      a tab extending from said proximal end substantially perpendicular to the longitudinal axis of said handle;
   a block positioned entirely between said proximal ends of said pair of handles, said block comprising:
      a front surface facing said distal end of one of said pair of handles;
      a rear surface facing said distal end of the other of said pair of handles;
      opposite side surfaces;
      a bottom surface having a projection extending therefrom; and
      an aperture extending between said front and rear surfaces; and
   a pin extending through said apertures in said pair of handles and said aperture in said block thereby allowing said pair of handles to pivot between a closed position and a deployed position, in which said tabs on said pair of handles engage a respective one of said side surfaces of said block;

a cord secured to said projection; and a hook secured to said cable for securing the apparatus to the game.

12. The apparatus for dragging game as recited in claim 11, wherein said hook comprises a spring loaded hook at a first end and a swivel at a second end, wherein said cord attaches to said swivel.

13. The apparatus for dragging game as recited in claim 11, wherein said block further comprises a top surface; and wherein said tabs on said pair of handles are substantially flush with said top surface of said block when the apparatus is in said deployed position.

* * * * *